Figure 1:
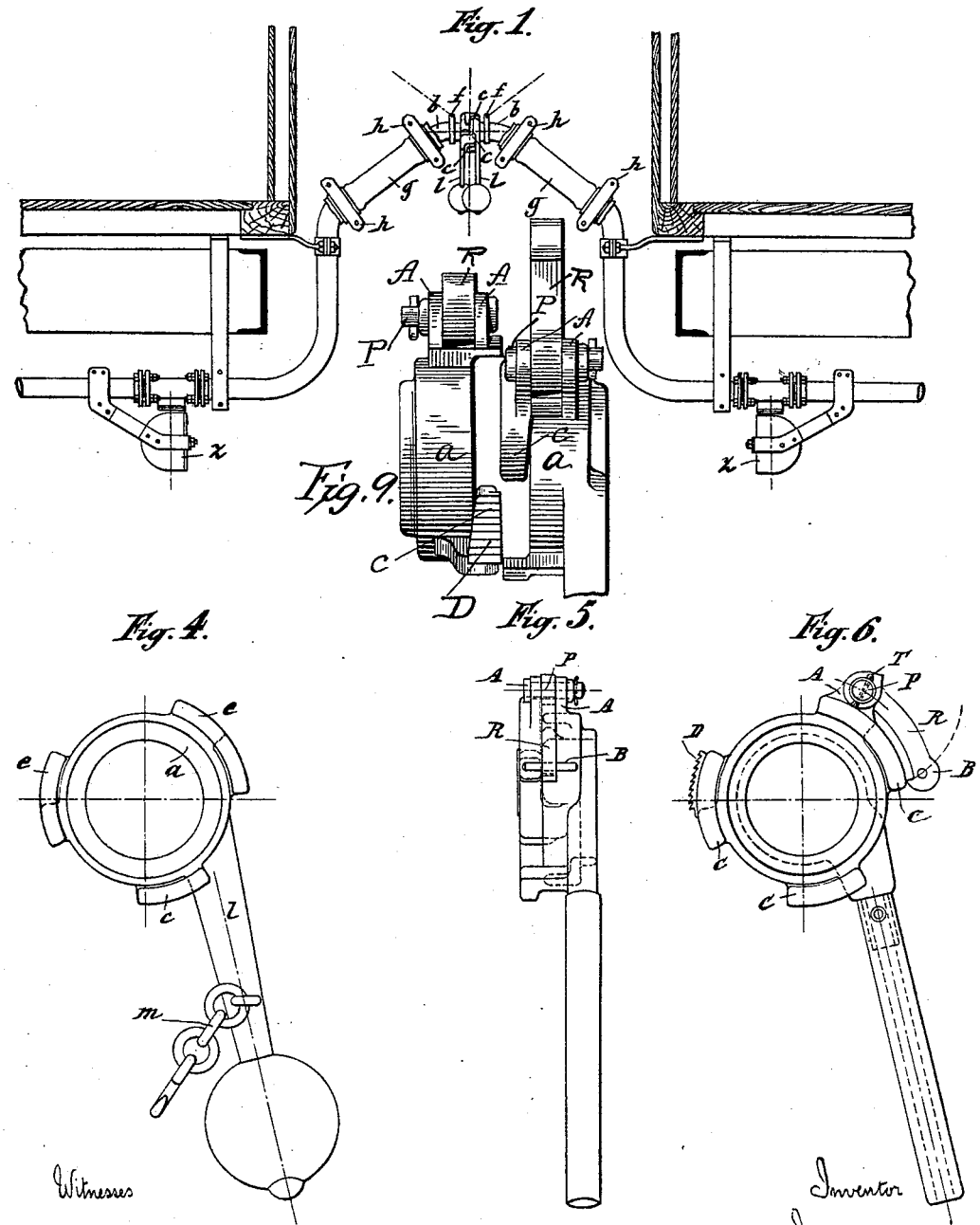

(No Model.) 2 Sheets—Sheet 2.
J. DERY.
TRAIN PIPE COUPLING.
No. 583,140. Patented May 25, 1897.
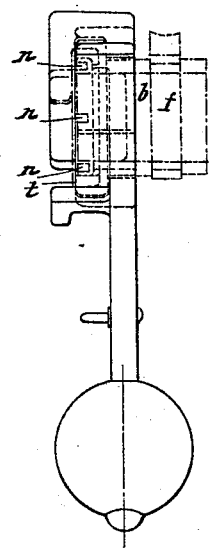
Fig. 2.
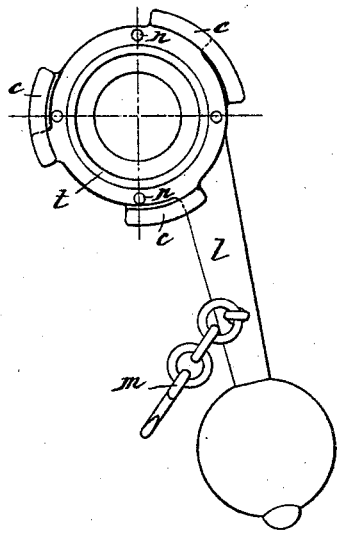
Fig. 3.
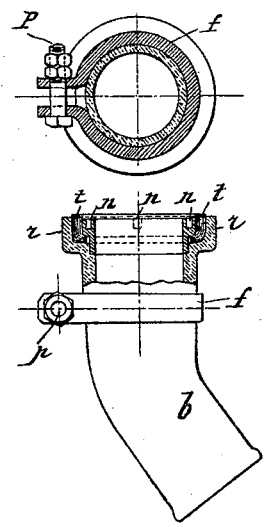
Fig. 1.
Fig. 8
Witnesses
H. vanDesenneel
E. K. Sturtevant
Inventor
Jules Dery
by Richardson
Attorneys

UNITED STATES PATENT OFFICE.

JULES DERY, OF BRUSSELS, BELGIUM.

TRAIN-PIPE COUPLING.

SPECIFICATION forming part of Letters Patent No. 583,140, dated May 25, 1897.

Application filed May 28, 1895. Serial No. 550,979. (No model.) Patented in Belgium February 6, 1895, No. 113,980; in France May 10, 1895, No. 247,293; in Luxemburg May 13, 1895, No. 2,304, and in England May 13, 1895, No. 9,522.

*To all whom it may concern:*

Be it known that I, JULES DERY, a subject of the King of Belgium, and a resident of Brussels, Belgium, have made certain new and useful Improvements in Hose or Pipe Couplings, of which the following is a specification, the invention having been patented in Belgium February 6, 1895, No. 113,980; in Luxemburg May 13, 1895, No. 2,304; in France May 10, 1895, No. 247,293, and in Great Britain May 13, 1895, No. 9,522.

My invention relates to couplings for conduit-pipes, and particularly to the couplings for pipes used in heating and ventilating railway-cars.

Figure 1 shows a side view of the coupling. Figs. 2, 3, 4, 7, and 8 are detail views of the parts on an enlarged scale. Figs. 5 and 6 show a modified construction of the coupling. Fig. 9 is a detail side view of the coupling-rings slightly separated.

The coupling consists of two levers $l$, each formed with three coupling-clamps $c$; two bent tubes $b$, provided with straps $f$, screwed to the same; two rubber pipes $g$, secured by the collars $h$, and two elbow-pipes of iron fixed by stays on the carriage.

The coupling proper consists of two annular pieces of metal $a$, each of which on the inner edge is provided with three wedge-shaped clamps $c$, arranged symmetrically, but of uneven length, so that the employees may not accidentally set the levers with the balls directed upward, which might cause the coupling to yield. In order further to secure the same, each lever is fitted with a small chain $m$, by which the levers are connected with one another when the coupling has been effected. The rings $a$, on which the clamps $c$ are mounted, are of somewhat greater width internally than the outer diameter of the tubes $b$, so that the rings will slip readily on the tubes and so that no torsion may take place in the rubber tubes and at the contact-surfaces.

The tube $b$, on which the upper part of the rubber pipe is fixed at the end where the coupling-rings work, carries a collar $r$, which is hollow (see Figs. 7 and 8) and in which a packing-ring $t$ is secured by means of an externally-screw-threaded ring of metal. The holes $n$ in the screw-ring (see Fig. 3) afford a hold to the screw-wrench. Thus the screw-rings can easily be changed. The strap $f$, screwed on the tube $b$, serves to retain the coupling-ring $a$ when it is loosened. Moreover, its screw-bolt $p$ carries a small chain to enable the pipe to be hung up on the side of the carriage when not in use or to keep the coupling raised when the vehicle is traveling.

When the coupling is connected, which is effected by bringing the clamps $c$ into contact with those on the next carriage and pressing down the levers, steam can pass, and the heat, causing expansion of the metal parts that touch one another, further tightens the coupling.

A modified construction is shown in Figs. 5 and 6. On one of the wedge-shaped clamps $c$ two shoulders A are provided, in which a toothed bar R is mounted by means of a strong bolt P. A hook T prevents its falling on the second lever when coupling up, and its free end has a bolt B, allowing it to be readily lifted when uncoupling. Corresponding with this toothed bar a few teeth are provided on the other part of the coupling D, and with these teeth the toothed bar engages, the toothed bar of the second carriage corresponding to the teeth of the first. By this device, which makes the coupling quite secure, the chain $m$, by which the levers $l$ have to be connected in the other case, can be dispensed with. The levers themselves may be hollow tubes without balls, making them much lighter and handier, and being hollow they will not get hot so easily.

I claim—

1. In combination in a hose-coupling a pair of nipples, a pair of coupling-rings adapted to receive said nipples, the said rings having a series of projecting cams each of which projects laterally from its ring so as to overlie the surface of the adjacent ring and extending a short distance circumferentially around the inner edge of the ring, each of said projections having its back or outer edges, that is the edges adjacent to the outer surface of the rings, slightly inclined, said outer edges or faces of the cams being at or substantially in the planes of the inner edges of the rings, and the projections on one ring being similar to those on the other ring, substantially as described.

2. In combination in a pipe or hose coupling, a pair of nipples, a pair of rings carrying the same, each of said rings having a series of cams projecting from the edge thereof both laterally and radially so that the cams of one ring will overlie the outer surface of the other ring to engage the cam thereof, one or more of said cams having serrated outer surfaces and the locking-pawl engaging therewith, substantially as described.

3. In combination in a pipe or hose coupling, the nipples, a pair of rings carrying the same, each ring having a series of cams projecting laterally and radially from the meeting edges of said rings whereby the cams of one ring will overlie the outer surface of the other ring to interlock laterally with the cams thereof, one or more of said cams having serrated outer surfaces and pawls engaging therewith, said pawls being pivoted in ears forming extensions of the outer sides of the interlocking cams, substantially as described.

4. In combination a pair of nipples, a pair of rings, each having locking-lugs projecting laterally therefrom to overlie the surface of the other ring, said projections being attached at one end to the ring thence extending circumferentially of the same a short distance with its free end slightly beyond the inner edge of the ring whereby an inclined face or cam-surface is provided on the outside of each projection which extends at an angle to and crosses the edge of the ring, the lugs on the two rings being similar, substantially as described.

In witness whereof I have hereunto set my hand in presence of two witnesses.

JULES DERY.

Witnesses:
AUGUSTE DE CEUSTER,
GREGORY PHELAN.